C. S. WILLIAMS.
APPARATUS FOR PRODUCING VULCANIZED ARTICLES.
APPLICATION FILED MAY 13, 1915.

1,180,358.

Patented Apr. 25, 1916.
2 SHEETS—SHEET 2.

WITNESS:
S. G. Taylor

INVENTOR
Carl S. Williams.

BY
Ernst Hopkinson
HIS ATTORNEY

UNITED STATES PATENT OFFICE.

CARL S. WILLIAMS, OF NEW YORK, N. Y., ASSIGNOR TO REVERE RUBBER COMPANY, A CORPORATION OF RHODE ISLAND.

APPARATUS FOR PRODUCING VULCANIZED ARTICLES.

1,180,358.              Specification of Letters Patent.      Patented Apr. 25, 1916.

Application filed May 13, 1915. Serial No. 27,744.

*To all whom it may concern:*

Be it known that I, CARL S. WILLIAMS, a citizen of the United States, residing in the city of New York, county and State of New York, have invented certain new and useful Improvements in Apparatus for Producing Vulcanized Articles, of which the following is a full, clear, and exact description.

This invention relates to apparatus for forming vulcanizable articles of rubber and similar materials and such apparatus as those employed in carrying out the process which comprises successively dipping the forms into a rubber solution and drying the coating in the presence of heat and a reduced air pressure or vacuum, the operation being repeated continuously until a layer of rubber of sufficient thickness has been obtained.

The object of my invention is to provide an improved apparatus for carrying out the process above mentioned, which apparatus is simple in construction, compact in arrangement, and easy of operation, and is adapted to produce superior articles with a minimum expenditure of time, labor and materials.

In the disclosure of this form of the invention, I do not wish to be understood as being limited to the precise details and arrangement of parts since this invention is intended to illustrate the type of apparatus in which variations may be made without departing from the general principle thereof.

Figure 1:
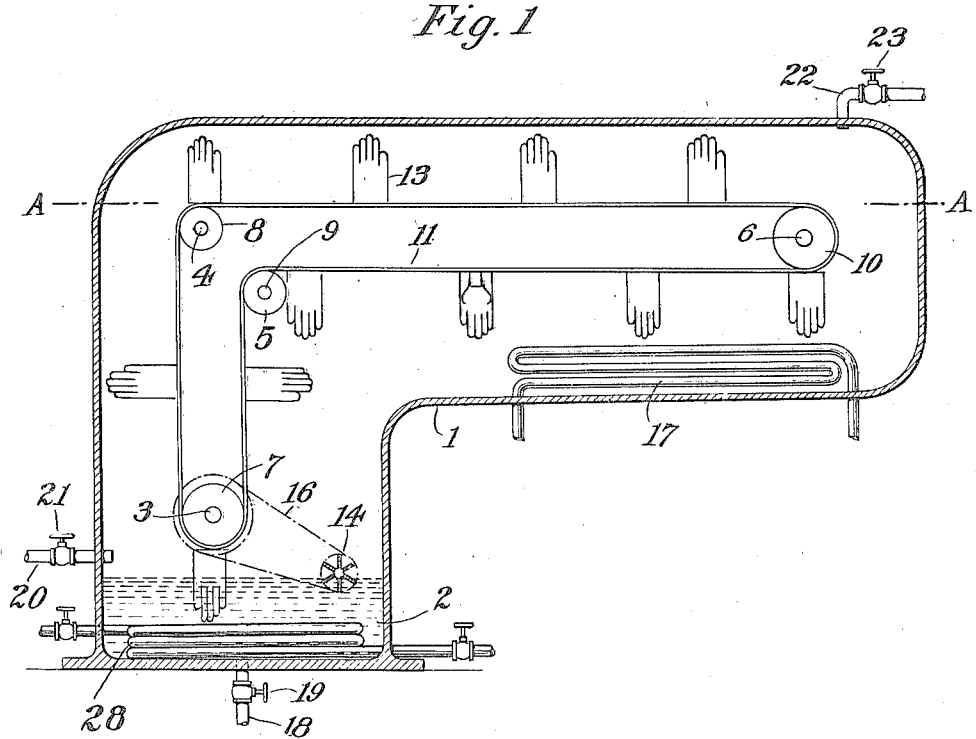
Figure 2:
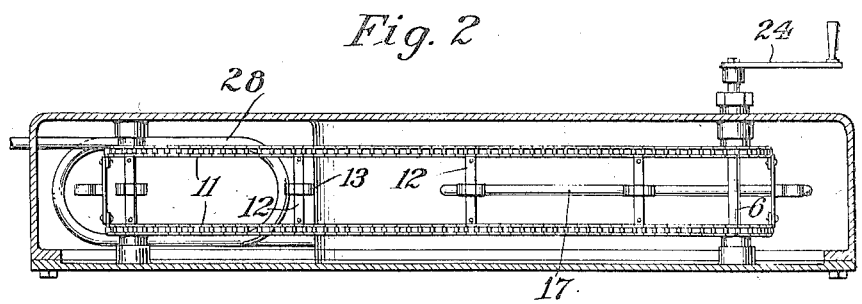
Figure 3:
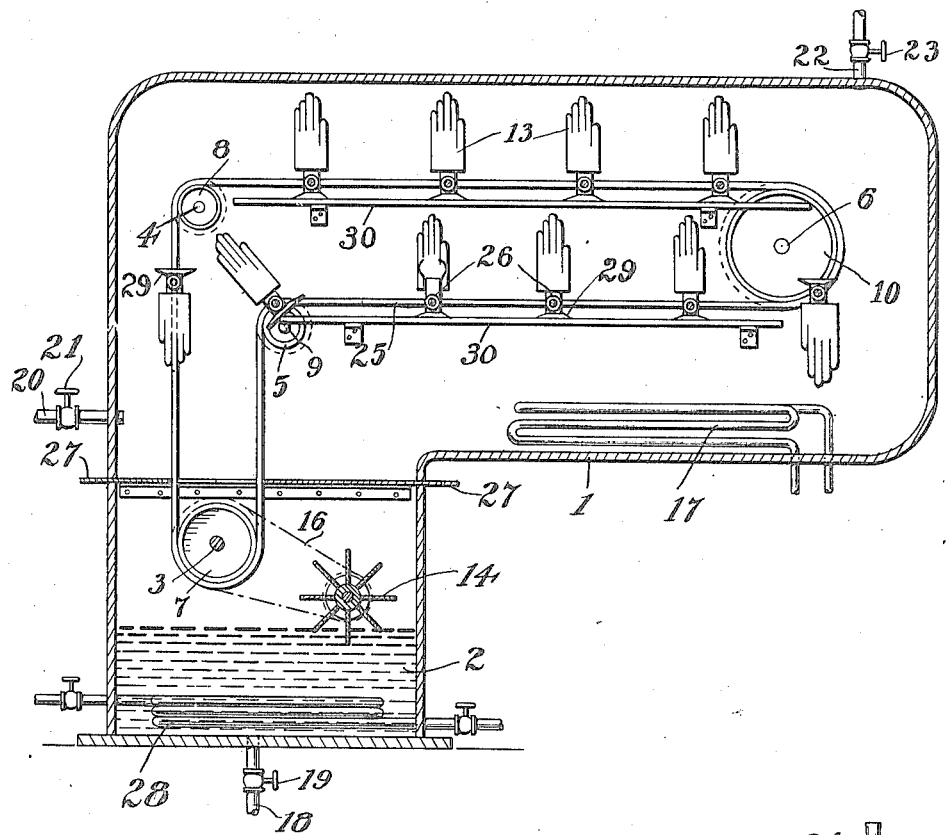

For a detailed description of two forms of my invention, reference may be had to the following specification and to the accompanying drawings forming a part thereof, in which:

Figure 1 is a vertical sectional view of one form of my apparatus; and Fig. 2 is a horizontal sectional view taken substantially on the line A—A, Fig. 1; Fig. 3 is a vertical sectional view of a modified form of the apparatus; and Fig. 4 is a horizontal sectional view thereof, the top of the casing being removed.

Referring to Figs. 1 and 2, the numeral 1 indicates a casing forming an L-shaped chamber, the lower portion of which is adapted to contain rubber solution at 2. Within the casing are rotatably mounted suitable shafts 3, 4, 5 and 6 provided with suitable wheels 7, 8, 9 and 10, such as sprocket wheels, over which sprocket chains 11 may pass. These chains have connected therewith at suitable intervals, cross-bars 12 on which are mounted the forms 13 to give the proper shape to the articles being manufactured. The numeral 14 indicates a paddle wheel forming an agitator for stirring the solution in the lower portion of the chamber which may be connected in any suitable manner with the shaft 3, as by a belt 16. The upper portion of the casing 1 is provided with a steam coil 17 for the purpose of heating that portion of the chamber. The lower portion of the chamber is also provided with an eduction pipe 18 having a valve 19 and an inlet pipe 20 having a valve 21. The upper portion of the chamber is connected with a pipe 22 having a valve 23. One end of the shaft 6 extends through the casing and is provided at its outer end with a crank handle 24 for the purpose of driving the chain 11 and carrying the forms successively into the rubber solution. When the rubber solution is placed in the lower portion of the chamber at 2 and the forms are in position on the cross-bars, steam is supplied to the coil 17 and a suitable degree of vacuum produced through the pipe 22. The crank handle 24 is then rotated to carry the forms into and out of the rubber solution the requisite number of times, the forms being successively dipped into the solution and carried to the upper portion of the chamber where they are submitted to the action of the heat of coil 17, and at the same time to reduced air pressure. This causes a rapid evaporation and drying of the articles as above described, the successive coatings being successively dried after each dipping. In this form of apparatus it will be appreciated that the dipping may be first accomplished under normal air pressure, the rubber solution removed from the chamber and the vacuum supplied, after which the rubber solution may be again introduced and the dipping continued.

Figure 4:
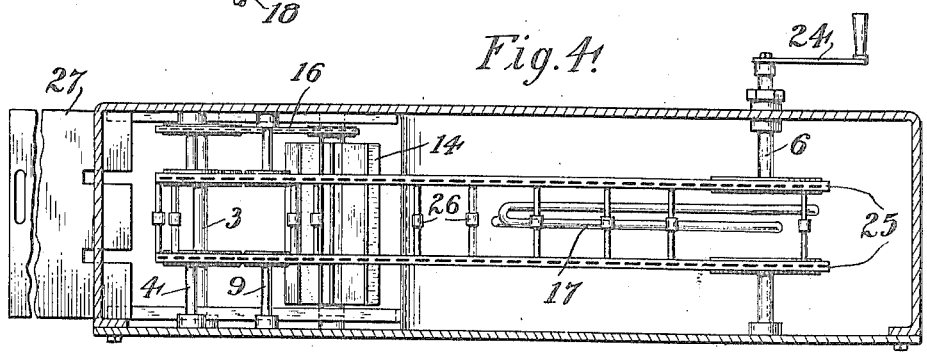

In the form of apparatus shown in Figs. 3 and 4, the chains 25 are provided with pivots or bearings 26 from which the forms 13 are suspended and the supports for the forms are provided with cross-bars 29 which are adapted to engage a track or guide 30 for the purpose of holding the forms upright while in the drying chamber. This arrangement permits the forms to enter and leave the rubber or other solution vertically and are afterward supported upright, so that the coatings thereon are always formed evenly and of uniform thickness.

I also provide means for separating the dipping chamber from the drying chamber by inserting a partition or diaphragm 27 which may be made in two sections, as indicated, so as to inclose the sprocket chains. This arrangement allows the rubber solution to be isolated from the heated atmosphere of the drying chamber during the drying operation, thus preventing undue heating and evaporation of the rubber solution.

In order to further maintain a constant and low temperature of the rubber solution in either form of the apparatus, I provide cooling coils 28 through which cold water or other cooling fluid may be circulated.

I do not wish to be understood as being limited to the forms of apparatus above described, or to the details of form or arrangements of parts illustrated, for various changes may be made without departing from the spirit and scope of my invention.

What I claim and desire to protect by Letters Patent is:

1. A dipping and drying apparatus comprising a closed chamber, a portion of which is adapted to contain the material of which articles are to be made, a movable support on which the forms for said articles are carried, means for producing a reduced fluid pressure in such chamber, and means for moving said support into and out of the portion of said chamber not containing said material and into and out of said material.

2. A dipping and drying apparatus comprising a closed chamber, a portion of which is adapted to contain the material of which articles are to be made, a movable support on which forms for said articles are carried, means for heating the portion of said chamber removed from said material, means for producing a reduced fluid pressure in said chamber, and means for moving said support into and out of said heated and material-containing portions of said chamber, respectively.

3. A dipping and drying apparatus comprising a closed chamber, a portion of which is adapted to contain the material of which the articles are to be made, a movable support on which the forms for said articles are carried, means for moving said support into and out of the two portions of said chamber, and a movable partition adapted to separate said portions during the drying operation.

4. A dipping and drying apparatus comprising a closed chamber, a portion of which is adapted to contain the material of which the articles are to be made, a movable support on which the forms for said articles are carried, means for moving said support into and out of the two portions of said chamber, means for heating the drying portion of said chamber, and means for maintaining said material at a low temperature to prevent undue evaporation of the same.

5. A dipping and drying apparatus comprising a closed chamber, a portion of which is adapted to contain the material of which articles are to be made, a flexible endless support on which the forms for said articles are carried, means for producing a reduced fluid pressure in said chamber, means for heating the drying portion of said chamber, and means for maintaining said material at a low temperature to prevent undue evaporation.

6. A dipping and drying apparatus comprising a closed chamber, a portion of which is adapted to contain the material of which articles are to be made, a flexible endless support on which the forms for said articles are carried, means for producing a reduced fluid pressure in said chamber, means for heating the drying portion of said chamber, means for maintaining said material at a low temperature to prevent undue evaporation, and a movable partition for separating the drying and dipping portions of said chamber during the drying operation.

7. A dipping and drying apparatus comprising a closed chamber, a portion of which is adapted to contain the material of which articles are to be made, a flexible endless support on which the forms for said articles are carried, means for heating the drying portion of said chamber, means for maintaining said material at a low temperature to prevent undue evaporation, and a movable partition for separating the drying and dipping portions of said chamber during the drying operation.

8. A dipping and drying apparatus comprising a closed chamber, a portion of which is adapted to contain the material of which articles are to be made, a movable support on which the forms for said articles are pivoted, and means acting upon the pivots thereof to maintain said forms in upright position in said drying chamber.

9. A dipping and drying apparatus comprising a closed chamber, a portion of which is adapted to contain the material of which articles are to be made, a flexible endless support on which the forms for said articles are pivoted, cross arms connected with said forms, and a track or guide adapted to engage said arms to maintain said forms in upright position in said drying chamber.

Signed at New York, county and State of New York, this 10th day of May, 1915.

CARL S. WILLIAMS.